Jan. 12, 1960 A. MACOVSKI 2,921,122

TELEVISION CHROMINANCE CHANNEL CONTROL SYSTEM

Original Filed Sept. 14, 1954 3 Sheets-Sheet 1

INVENTOR.
Albert Macovski
BY
[signature]
ATTORNEY

TELEVISION CHROMINANCE CHANNEL CONTROL SYSTEM

Original Filed Sept. 14, 1954 3 Sheets-Sheet 2

INVENTOR.
Albert Macovski
BY
[signature]
ATTORNEY

Jan. 12, 1960 A. MACOVSKI 2,921,122

TELEVISION CHROMINANCE CHANNEL CONTROL SYSTEM

Original Filed Sept. 14, 1954 3 Sheets-Sheet 3

United States Patent Office 2,921,122

Patented Jan. 12, 1960

2,921,122

TELEVISION CHROMINANCE CHANNEL CONTROL SYSTEM

Albert Macovski, Massapequa, N.Y., assignor to Radio Corporation of America, a corporation of Delaware Continuation of application Serial No. 455,921, September 14, 1954. This application February 14, 1956, Serial No. 565,387

21 Claims. (Cl. 178—5.4)

The present invention relates to circuits for automatically switching between two modes of operation, and more particularly, but not exclusively, it relates to means for color killer action; that is, the automatically turning on and off the chrominance circuits of a color television receiver depending upon the presence or the absence of a color synchronizing burst in the incoming television signal. The present invention also relates to the combination of color killer action with automatic and manual chrominance gain control.

This application is a continuation of my copending application, Serial No. 455,921, filed September 14, 1954, bearing the title "Television Chrominance Channel Control System."

A primary object of this invention is to provide improved color killer action in a color television receiver.

Still another object of this invention is to eliminate the crosstalk resulting from the television signal passing through the chrominance channels during black and white or monochrome television signal reception.

It is a further object of this invention to provide a color killer circuit which permits positive switching from monochrome operation to color signal operation in a color television receiver.

It is a still further object of this invention to provide combined color killer and automatic chrominance-channel gain-control action in a color television receiver.

According to the present invention color killer action is achieved by use of a chrominance amplifier whose gain is a function of a multiplicity of control grid biases one of which is in turn a function of a control voltage applied to an auxiliary electron control device. The color synchronizing burst is separated from the chrominance signal at the output of the chrominance amplifier and applied to a suitable detector circuit. This detector circuit is utilized to provide a bias for the auxiliary electron control device such that during the color synchronizing burst, the auxiliary electron control device will be cut off and another control grid bias already provided to the chrominance amplifier will bias the chrominance amplifier on. When on color synchronizing bursts are present, the auxiliary electron control device is caused to conduct; pulses produced during the color synchronizing burst time are applied to the control electrodes of the auxiliary electron control device thereby causing the chrominance amplifier to be pulsed on at least during the color synchronizing burst intervals. If the color synchronizing burst is absent, then each pulse supplied to the chrominance amplifier by the auxiliary electron control device will develop a bias voltage which will bias the chrominance amplifier off until the next pulse appears.

It follows then that the procedure of pulsing the auxiliary electron control device during the duration time normally allotted to the color synchronizing bursts, permits the use of a high gain feedback circuit which constantly explores the incoming signal for the presence or absence of the color synchronizing bursts for turning the chrominance amplifier on or off depending on whether the color synchronizing burst is present or absent, respectively.

In one form of the invention the color synchronizing burst may be separated from the color television signal, should the burst be present, by including in the final chrominance amplifier an auxiliary output circuit which is responsive to the burst frequency. The auxiliary output circuit is coupled in parallel with a diode which normally conducts during the scanning intervals and produces a virtual short circuit of the auxiliary output circuit. During the time normally allotted for the color synchronizing bursts, however, a suitably produced pulse causes the diode to become non-conducting, thereby permitting the color synchronizing burst to be developed in this auxiliary output circuit should it be present during this time. The separated burst may then be applied to a discriminator circuit in conjunction with a signal from a reference signal oscillator and the discriminator circuit itself may be utilized, in one or more of its components, to provide a reference signal which either represents the signal strength of the color synchronizing burst or yields a potential which is indicative of the presence or the absence of a separated color synchronizing burst.

In another form of the invention utilizing the color killer circuit taught by the present invention, the burst detector circuit is caused to develop the previously mentioned reference voltage which is proportional to the amplitude of the color synchronizing burst; this reference voltage is applied to the chrominance signal amplifier to vary the gain of the chrominance amplifier whereby the amplitude of the chrominance signal appearing at the output of the chrominance amplifier is substantially independent of the amplitude of the chrominance signal applied to the chrominance channel, thereby yielding automatic chrominance-channel gain-control action hereafter referred to as automatic chroma control.

In yet another form of the invention employing both color killer and automatic chroma control action, positive pulses, produced during the duration intervals of the color synchronizing bursts, are applied to the chrominance amplifier to which the automatic chroma control action is applied; the positive pulses change the gain of the chrominance amplifier so that an apparent change in the amplitude level of the incoming color synchronizing bursts and therefore the chrominance signal is effected. By providing manual control of the amplitude of the positive pulses, the amplitude of the chrominance signal provided at the output of the chrominance amplifier may be continuously varied without interfering with the automatic chroma control action.

Other and incidental objects of this invention will become apparent upon a reading of the following specification and a study of the figures wherein.

Like elements in the various figures will be designated by the same numeral.

Figure 1:
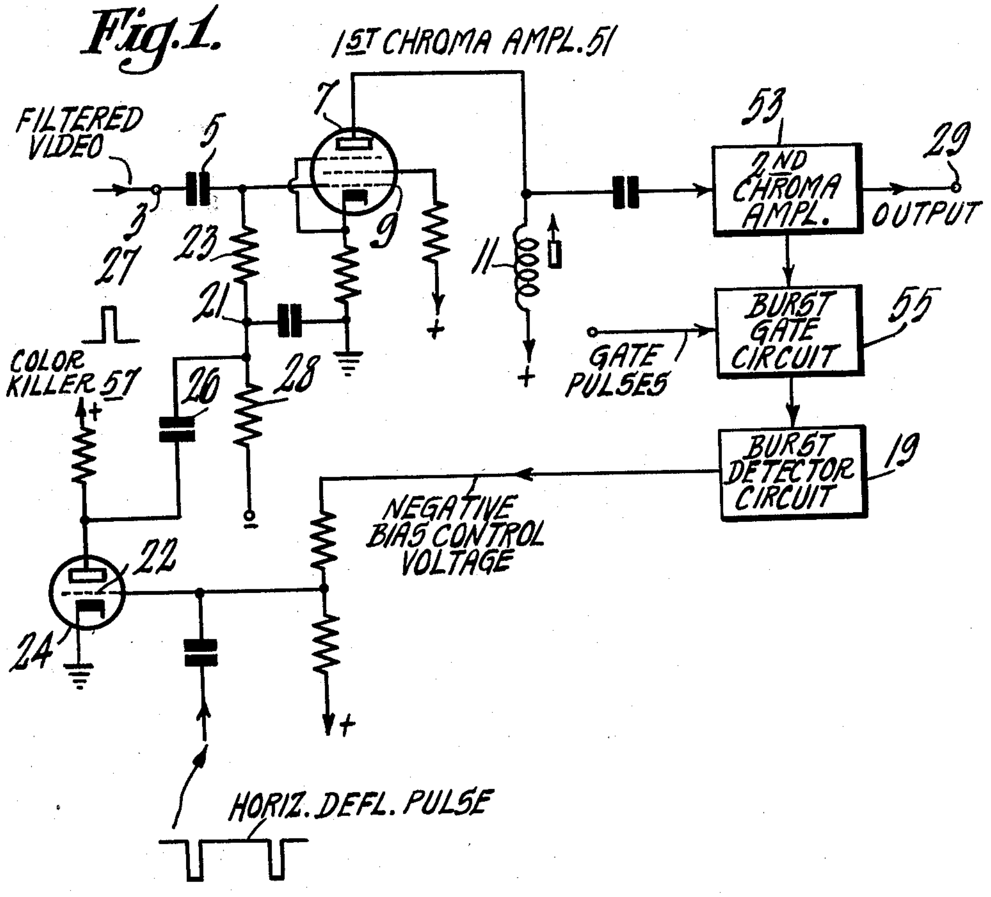
Figure 1 shows a simplified color killer circuit based on the teaching of the present invention.

The color television signal standardized by the Federal Communications Commission on December 17, 1953, contains four types of information. One type of information is the scanning synchronizing information which is transmitted in the form of vertical and horizontal deflection pulses. In addition, there is transmitted a brightness or luminance signal which is substantially the same as that conventionally employed for black and white television image transmission. This luminance signal is allotted a bandwidth which includes picture components having frequencies up to approximately 4.2 mcs.

In addition, a chrominance signal containing color-difference signal information is transmitted on a color subcarrier wave having a frequency of 3.58 mcs. The bandwidth of the chrominance signal extends from approximately 2 mcs. to 4.2 mcs.; by utilizing a color subcarrier wave whose frequency is substanially equal to that of an odd multiple of one-half the line scanning frequency, the spectral groups representative of both luminance information and chrominance information are then substantially interspersed thereby minimizing crosstalk.

The color-difference signal information present in the chrominance signal may be demodulated by synchronous detection. Synchronous detection involves the heterodyning of the chrominance signal with a locally generated demodulating signal at a phase which is representative of the particular color-difference signal being demodulated and which is related in phase to what is hereinafter referred to as a reference phase. In order to provide reference phase signal information, another type of signal is transmitted. This signal is in the form of color synchronizing bursts of approximately 8 cycles of a wave having a frequency of 3.58 mcs. and serves to establish a reference phase which may be utilized for developing suitably phased demodulating signals for the synchronous detection of color-difference signal information present in the chrominance signal. Each color synchronizing burst is transmitted on the back porch of the horizontal synchronizing pulses. It is to be noted that the color synchronizing burst actually not only yields the reference phase which is so essential for the demodulation of the color-difference signal information, but also its presence or absence gives indication of whether the signal arriving at the television receiver is a monochrome signal, in which case the color synchronizing bursts will be absent, or a color television signal, in which case the color synchronizing bursts will be present.

In the range of frequencies of a color television signal from approximately 2 to 4.2 mcs. both luminance and chrominance information are present. In a color television receiver, both luminance and chrominance channels are employed, with the picture information up to 4.2 mcs. being utilized in the luminance channels and with the chrominance information from above 2 mcs. to approximately 4.2 mcs. being utilized in the chrominance channels. Should a television signal including only monochrome information be received by the color television receiver, the bandwidths of the luminance and chrominance channels are such that the band of signal frequencies from 2 mcs. to 4.2 mcs. will pass into the chrominance channels which, without the use of the present invention, would be unable to distinguish as to whether these signal components represent monochrome or chrominance information. In the case of a received monochrome signal, these higher frequency luminance signals passing through the chrominance channels will yield improper signal components to the color image reproducer to produce spurious or false color image reproduction.

A simplified circuit representing one embodiment of the present invention, as devoted to color killer action in a chrominance signal amplifier channel, is shown in Figure 1. Here the chrominance signal which involves the frequency components bearing principally chrominance information and also the color synchronizing burst is impressed on the input terminal 3 and applied to the control grid 9 of the amplifier tube 7. The bandwidth of the chrominance signal is adjusted for the particular type of color difference signals which are to be demodulated. If full advantage is to be taken of the color-difference signal information present in the chrominance signal, then the bandwidth should be adjusted for a range from substantially 2 to 4.2 mcs.; if all color-difference signals in the chrominance signal are to have substantially the same bandwidth, then a chrominance signal bandwidth from substantially 3 to 4.2 mcs. may be satisfactory.

The amplified chrominance signal is developed across the output resonant circuit 11 and applied to the second chroma amplifier 53 which amplifies both the chrominance signal and the color synchronizing bursts and delivers these signals to the output terminal 29; the chrominance signal and the color synchronizing burst, in amplified form, are delivered to the burst gate circuit 55 which is activated by suitable gate pulses so that the burst gate is opened during the duration interval of the color synchronizing bursts to produce separated color synchronizing bursts which are applied to the burst detector circuit 19. The burst detector circuit 19 yields a negative bias voltage whose absolute amplitude is proportional to the amplitude of the separated color synchronizing bursts. The negative bias voltage furnished by the burst detector 19 is then applied through the voltage divider network 20 to the control grid 22 of the electron tube 24. The resulting negative bias voltage should be sufficient to cause the electron tube 24 to be biased beyond cut-off when color synchronizing bursts are present. A separately-provided bias voltage is also provided at the terminal 21 which is coupled through the resistor 23 to the control grid 9 of the electron tube 7 so that the electron tube 7 which constitutes the first chroma amplifier 51 will conduct and produce suitable amplification of the color synchronizing burst and the chrominance signal.

When no color synchronizing bursts are present the burst detector circuit 19 will furnish a less negative bias voltage through the voltage divider 20 to the control grid 22 which will cause the electron tube 24 of the color killer 57 to conduct heavily. In addition, negatively polarized horizontal synchronizing pulses 131 are applied to the control grid 22 of the electron tube 24 so that when the electron tube 24 conducts heavily, positive pulses 27 are introduced to the terminal 21 through the capacitance 26. By choosing correct time constant for the capacitance 26 and the resistance 28, the pulses 27 will bias the control grid 9 of the tube 7 to a point where the electron tube 7 will be biased on during the pulses 27 and therefore during burst time, and off between bursts.

The overall gain circuit of the first chroma amplifier 51 is, essentially speaking, a feedback circuit and, if after a period when no color synchronizing bursts have appeared, color signal transmission is resumed, means must be provided for the color synchronizing burst to pass through the first chroma amplifier 51 so that the burst detector circuit 19 may supply a suitable negative bias voltage to the color killer 57 which will cause the first chroma amplifier 51 to be turned on. The horizontal deflection pulses 131 as applied to the control grid 22 of the electron tube 24 automatically yield this action since the polarity and the amplitude of these horizontal deflection pulses are chosen so that even during the time when the color killer normally keeps the first chroma amplifier 51 biased off during the scanning line, the horizontal synchronizing pulses, as applied to the control grid 22, cause electron tube 7 to conduct during the time intervals normally associated with the color synchronizing burst even though they may not be present. The positive pulses are then provided by a color killer 57 to the control grid 9 of the first chroma amplifier 51 during these duration intervals so that the first chroma amplifier 51 will always amplify during these duration intervals. Should a color synchronizing burst appear, it will then pass through the first chroma amplifier 51 and the second chroma amplifier 53 to reach the burst detector circuit 19 and serve to deactivate the color killer 57 whereby the first chroma amplifier 51 will be turned on again during scanning intervals.

Figure 2:
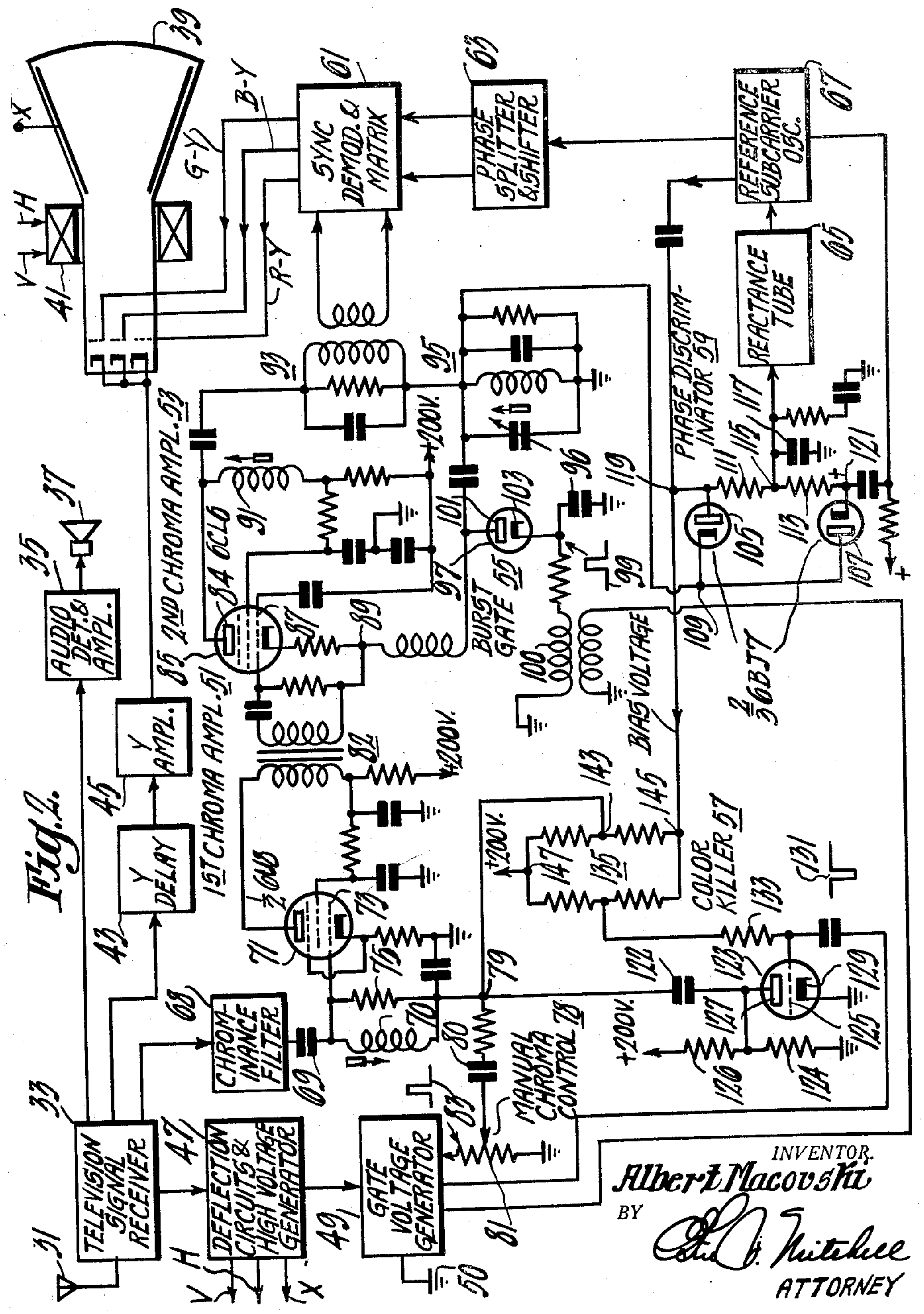
Figure 2 shows a diagram of a color television receiver which utilizes both a color killer and an automatic and manual chroma control circuit illustrating one embodiment of the present invention.

In the color television receiver circuit shown in Figure 2, the transmitted color television information reaches the antenna 31 and is applied to the television signal receiver 33 which provides recovery of the color television signal. In the color television signal receiver 33 such functions as first detection, intermediate frequency amplification, second detection and automatic gain control are provided; these and other functions which are utilized in commercial television signal receivers are described, for example, in the paper entitled, "Television Receivers" by Antony Wright as published in the June 1947 issue of the RCA Review.

The recovered color television signal as yielded by the television signal receiver 13, then contains the deflection synchronizing signals, the luminance information, the chrominance signal, the color synchronizing bursts and, in one form of circuit, contains the audio information which has been transmitted on a frequency modulated subcarrier 4½ mcs. removed from the video carrier.

Utilizing, for example, the well known principles of intercarrier sound, the audio information is recovered and amplified in the audio detector and amplifier 35 and applied to the output loud speaker 37.

The recovered television signal is coupled to the deflection circuits and high voltage generator 47, which in response to the deflection synchronizing signals, supplies vertical and horizontal deflection signals to the yokes 41, in addition to a high unidirectional voltage which is applied to the ultor of the color image reproducer 39.

In addition, the deflection circuits and high voltage generator 47 is utilized to furnish excitation for the gate voltage generator 49 which, in the circuit to be described, provides gate voltages which have substantially the duration interval of at least that of the color synchronizing burst and which have the potentials and polarities required for the specific applications for which the gate voltages are designed.

In still another branch of the color television receiver, the recovered color television signal, in the form of the luminance signal is passed through the Y delay 43 and Y amplifier 45 from which amplifier the luminance signal is amplified to a suitable level and applied to the cathodes of the color image reproducer 39.

The chrominance circuit functions to provide color difference signal information from the color television signal. These color difference signals will be impressed on suitable control electrodes of the color image reproducer 39 so that signal addition of the color difference signals and the luminance signal is achieved within the color image reproducer. In other forms of color image receivers auxiliary adder circuits are used for the addition of signals of the luminance and color difference signal variety with the resulting component color reference signals then applied to suitable control electrodes of the color image reproducer.

Consider now the general operation of the circuits which handle the chrominance signal and provide recovery of the color difference signals; some of these circuits are shown in block diagram in Figure 2; those circuits which illustrate the present invention are illustrated in schematic form in Figure 2.

The recovered color television signal is passed through the first chroma amplifier 51 and the second chroma amplifier 53. These chroma amplifiers are designed to include bandpass filter circuits and provide amplification so that the chrominance signal is separated from the luminance information consisting of components below substantially 2 mcs.; the resultant amplified chrominance signal is then applied to the sync demodulators and matrix 61. At the same time, a reference subcarrier oscillator 67 is caused to function under control of a reactance tube 65 and a phase discriminator 59. The burst gate 55 separates the color synchronizing burst from the chrominance signal; the separated color synchronizing burst is then applied to the phase discriminator 59. The phase of the color synchronizing burst is compared to the phase of the signal provided by the reference subcarrier oscillator 67. Should the phase of the signal provided by the reference subcarrier oscillator 67 differ from that prescribed by the color synchronizing burst or be the same, the phase discriminator 59 will then provide a phase-difference-indicating signal which is then applied to the reactance tube 65. The reactance tube 65 returns the frequency of the phase of the reference subcarrier oscillator 67 to the phase and frequency prescribed by the color synchronizing burst.

The output of the reference subcarrier oscillator 67 is then impressed on the phase splitter and shifter 63 which provides synchronous demodulating signals to the synchronous demodulators and matrix 61. Utilizing circuits which accomplish synchronous demodulation and signal addition for color difference information at predetermined phases, the synchronous demodulators and matrix 61 is then employed to yield R—Y, B—Y and G—Y signals which are applied to the control electrodes of the color image reproducer 39.

Consider in detail the operation of the color killer 57 shown in Figure 2; this color killer 57 operates in conjunction with the first chroma amplifier 51, the second chroma amplifier 53, the burst gate 55, and the phase discriminator 59. As has been mentioned earlier in these specifications, the color killer 57 is designed to stop the transmission of the chrominance signal through the chrominance channel when only luminance or monochrome signal information is reaching the color television receiver. This condition is positively indicated by the absence of the color synchronizing bursts on the back porch of the horizontal synchronizing pulses. When a complete color television signal is being transmitted, the color synchronizing bursts are then present and the color killer 57 allows the chrominance amplifier 51 and therefore the chrominance channel to transmit the chrominance signal.

In a so-called narrow band color television receiver, bandpass filters of the type shown as block 68 will have a pass band from substantially 3 to 4.2 mcs. In color television receivers operating as so-called wide band color television receivers making use of the full definition included in the chrominance signal, the chrominance band pass amplifiers will have a pass band from approximately 2 to 4.2 mcs. The output of the chrominance bandpass filter 68 is then applied to the control grid 73 of the tube 71 of the first chroma amplifier 51. The first chroma amplifier 51 is used to drive the second chroma amplifier 53, which provides additional amplification of the deflection signal. The second chroma amplifier 53 has a unique output circuit which represents one form of burst separation circuit with which the color killer 57 may be incorporated. The second chroma amplifier 53 has a pair of output circuits essentially in series. One output circuit 93 is the chroma tank circuit which has pass band characteristics suitable for the transmission and amplification of the entire chrominance signal. This output circuit 93 is coupled to the sync demodulators and matrix 61. The second output circuit consists of the tuned output circuit 95 which is a high-impedance burst tank circuit which is tuned to precisely the frequency of the color synchronizing burst. Connected in shunt with the tuned output circuit 95 is the diode 97 whose cathode 103 is actuated by the gate voltage 99 which has approximately 150 volts peak-to-peak and is positive in polarity. During substantially the duration interval of the color synchronizing burst, the gate voltage 99 causes the diode 97 to not conduct, whereupon the color synchronizing burst appears principally across the burst tank circuit 95. During the time interval when the scanning process is performed, the diode 97 is caused to conduct heavily resulting in a virtual short circuit of the burst tank circuit 95, so that during the scanning line the second chroma amplifier 53 operates into substantially the chroma tank circuit 93 across which the chrominance signal is developed.

It follows then that the incorporation into the second chroma amplifier 53 of both the chroma tank circuit 93 and the burst tank circuit 95 operating in conjunction with the pulsed diode 97 offers a simple method of burst separation and chrominance signal amplification. The signal provided in the burst tank circuit 95 during the color synchronizing burst interval is, of course, the separated color synchronizing burst which is then fed to the phase discriminator 59. It is noted that the diode 97 obtains a biasing current from the cathode of the second chroma amplifier tube 85.

The phase discriminator 59 consists essentially of the diodes 105 and 107 which are connected in such a way that the cathode of diode 105 and the anode of diode 107 are coupled to the burst tank circuit 95, and the anode of diode 105 and the cathode of diode 107 are coupled to ground by means of the resistor and condenser network made up of the resistors 111, 113 and the condenser 117. The reference subcarrier oscillator 67 provides properly phased signals to the terminals 119 and 121 which represent connections to the anode of diode 105 and the cathode of diode 107, respectively.

The action of the phase discriminator 59 is then to compare the phase of the signal provided by the burst gate 55 with the phase of signal generated by the reference subcarrier oscillator 67. A phase difference indicating signal is produced across the condenser 117 which also integrates this signal. The integrated signal produced across the condenser 117 then is a substantially continuous signal which yields indication of phase and frequency difference existing between the color synchronizing burst and the signal generated by the reference subcarrier oscillator 67.

The phase discriminator 59 also provides an additional function. A control voltage is produced between terminal 119 and ground which is negative with respect to ground and which represents amplitude detection of the color synchronizing burst. This control voltage yields indication of the presence or absence of the color synchronizing burst and also of its amplitude. This voltage, developed at the terminal 119 of the phase discriminator 59, is then utilized by way of the voltage divider 135 as a bias voltage for the color killer triode 123. The color killer triode 123 has an anode 127 which is coupled to not only the 200 volt potential source by way of the output loads 126 and 124, but also to the terminal point 79 by way of the coupling condenser 122. At terminal point 79, the pulses and potentials developed by the color killer action when the received television signal represents a monochrome image are applied to the control grid 73 of the first chroma amplifier 51.

Since the overall conduction-control circuit associated with the first chroma amplifier 51 shown in Figure 2 consists essentially of a feedback loop, it is important that means be incorporated in the circuit whereby the first chroma amplifier 51 be permitted to conduct at least during what would normally be the color synchronizing burst interval, even though no color synchronizing burst is present. If this provision were not made, then the first chroma amplifier 51 would always be cut off and no color synchronizing burst would be permitted to reach the second chroma amplifier 53 and be gated into the phase discriminator 59 by means of the burst gate 55. The action of causing the first chroma amplifier 51 to always conduct at least during the time interval normally allotted to the color synchronizing burst on the back porch of the horizontal synchronizing pulse is accomplished by impressing the gate pulse 131 on the control grid 125 of the color killer triode 123. This gate pulse 131 is a negative gate pulse having about 10 volts peak-to-peak; its duration interval is at least that which is normally allotted to the color synchronizing burst. Regardless of whether monochrome transmission or color television transmission is being received, this gate pulse 131 causes a positive pulse to appear at the control grid 73 of the first chroma amplifier 51 and this amplifier is thereby caused to be always conducting during the color synchronizing burst interval time.

During color transmission, the color synchronizing burst passes through the first chroma amplifier 51 to the second chroma amplifier 53 where it is gated by the burst gate 55 into the phase discriminator 59; the negative voltage provided at the terminal 119 by the phase discriminator 59 is utilized to actuate the color killer 57 in a manner whereby the color killer tube 123 is rendered non-conducting. When the color killer tube 123 is rendered non-conducting by the negative voltage at terminal 119, the tube 123 is unaffected by the negative pulse 131, and the bias at terminal 79 permits the chroma amplifier 51 to amplify both chrominance and burst signals.

When monochrome transmission is received by the color television receiver, the reduced-amplitude potential developed at terminal 119 of the phase discriminator is opposed by the positive potential provided by the voltage divider 135 to the color killer control grid 125 and the color killer triode 123 conducts heavily. The action of the negative gate pulse 131 on the control grid 125 thereupon produces corresponding positive pulses in the anode circuit of color killer triode 123. The positive pulses applied to the terminal 79 cause the tube 71 to conduct during pulse time. In between positive pulses, the voltage represented by the trough of the pulse waveform at terminal point 79 in combination with the voltage provided to this terminal point by the voltage divider 135, cuts off the first chroma amplifier 51 until the next gate pulse 131 which is applied to the control grid 125.

Note also that the bias voltage provided by the phase discriminator 59 to the voltage divider 135 provides a biac potential to the control grid 73 of the first chroma amplifier 51 which is proportional to the amplitude of the color synchronizing bursts; this bias potential yields automatic control of the amplitude of the chrominance signal and the color synchronizing bursts developed in the output circuits of the second chroma amplifier 53. Also a positive gate voltage having a peak to peak voltage of approximately 10 volts is applied to the potentiometer 81 which represents the manual control of the amplitude of the amplified chrominance signal. The action of this circuit is one which provides what will herewith be termed automatic and manual chroma control. The potentiometer control 81 which is hereinafter referred to as the manual chroma control 81, varies the magnitude of the amplified chrominance signal provided by the second chroma amplifier 53 in accordance with personal preference, with automatic chroma control being maintained regardless of the setting of the manual chroma control.

Manual and automatic chroma control are accomplished in the following manner. The color synchronizing burst is gated by means of the burst gate 55 into the phase discriminator 59 to yield the bias voltage at the terminal 119 which is used for color killer action in a manner previously described. This bias voltage also yields another important type of information; i.e., namely, the magnitude of the color synchronizing burst and, therefore, the amplitude level of the chrominance signal. This bias voltage is then applied through the voltage divider 135 to the terminal 79 so that the bias on the first chroma amplifier 51 is controlled in accordance with the amplitude level of the color synchronizing burst in a manner whereby during transmission of a color television signal, the amplitude of the chrominance signal developed across the output circuit 93 is kept constant regardless of the precise amplitude level of the chrominance input signal. As the amplitude of the chrominance signal applied to the first chroma amplifier 51 increases, the color synchronizing burst appearing at the burst gate 55 increases in amplitude to increase the negative bias applied to the terminal 79 of the first chroma amplifier 51; the gain of the first chroma amplifier 51 is then reduced accordingly. Conversely, when the amplitude of the color synchronizing burst decreases, the negative bias applied to the terminal 79 will decrease and the gain of the first chroma amplifier will increase accordingly.

The action of the manual chroma control 81 in conjunction with the gate voltage 83 is such that a positive pulse is added to the bias at the terminal 79. This positive pulse tends to increase the gain during the burst interval of the signal; the increase in the amplitude of the color synchronizing burst immediately increases the negative bias applied to the terminal 79 which in turn increases the gain of the first chroma amplifier 51. However, the amplitude of the chrominance signal output of the second chroma amplifier 53 is reduced due to the increased negative bias which is in existence during the entire scan; thus, by changing the relative gain between the color synchronizing burst and the chrominance signal in the chrominance amplifier with a pulse of adjustable amplitude and by keeping the amplitude of the color synchronizing burst substantially constant by use of the gain control system which involves the color synchronizing burst only, the chrominance signal may be manually controlled without varying the amplitude of the color synchronizing burst in a manner which maintains the advantages of automatic chroma control.

The circuit shown in Figure 2 then has the added advantage whereby color killer action and automatic and manual chroma control may be incorporated into a color television receiver utilizing the same color-synchronizing-burst responsive bias voltage generating sources.

Figure 3:
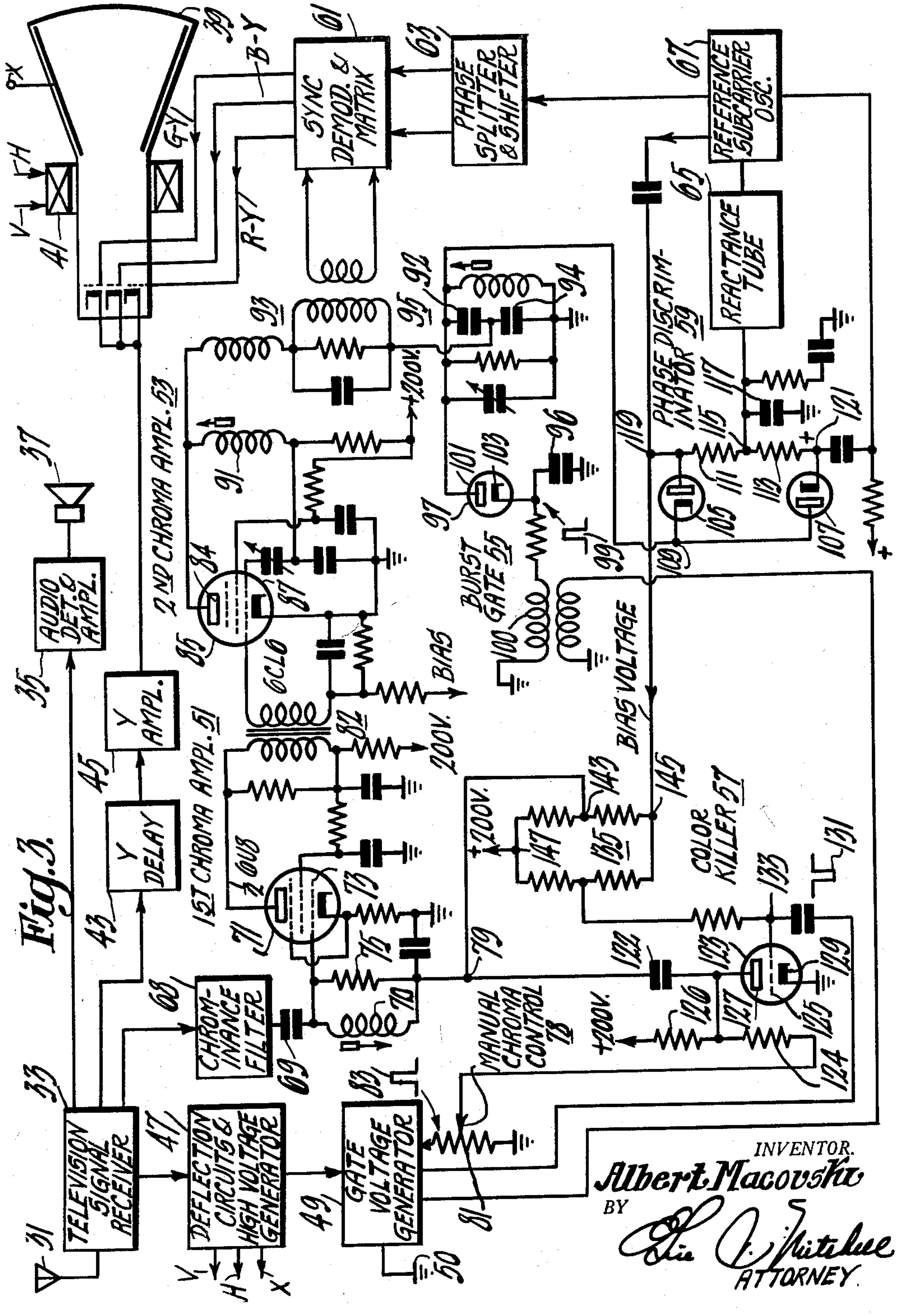
Figure 3 shows another form of a color killer and automatic and manual chroma control circuit in a color television receiver.

Fig. 3 shows a modification of the color television receiver circuit shown in Fig. 2 wherein is provided a simplification of the circuits relating to the manual chroma control circuit and also the burst gate.

In the color television receiver circuit shown in Fig. 3, the sliding contact of the manual chroma control 81 is coupled through the resistor 124 and the condenser 122 of the color killer 57 to the control grid 73 of the first chroma amplifier 51. This has the advantage of eliminating the need for the condenser 80 utilized in the color television receiver circuit shown in Fig. 2 and provides that the pulses 83 yielded by the manual chroma control 81 are provided through the output circuit of the color killer 57 at a time when the color killer triode 123 is not conducting thereby causing the output circuit of the color killer to perform a dual function.

The simplified circuitry associated with the burst gate circuit involves separation of the cathode circuit of the second chroma amplifier 53 from the burst gate 55; in the color television receiver circuit shown in Fig. 2, the cathode current of the amplifier tube 85 was utilized to provide the bias current of the diode 97.

In the circuit shown in Fig. 3, the burst tank 95 includes a condenser voltage divider made up of the condensers 94 and 92 to whose mid-connection is applied the connection from the chroma tank 93. The diode 97 is then coupled through a decay circuit, made up of the resistor 98 and the condenser 96, to ground by way of the gate-voltage-transformer winding 100. Rectification action is then caused to take place in the time intervals between the gate pulses 99 due to the alternating current voltage developed across the burst tank 95 with the diode bias current furnished by the rectification and with the diode and decay circuit causing a heavy loading of the burst tank 95 during these time intervals.

Having described the invention, what is claimed is:

1. A color television receiver adapted to receive a television signal wherein color synchronizing bursts in a frequency range of said television signal are included only during color transmission, said bursts occurring during prescribed time intervals, said receiver including a color information channel having an input circuit responsive to the frequency range of said television signal, means to derive from said color information channel a control signal representative of said color synchronizing bursts, means responsive to said control signal to control the gain of said color information channel when said bursts are included in the transmitted signal and to reduce the gain of said color information channel when said bursts are not included in the transmitted signal, and means to maintain amplification in said color information channel during time intervals corresponding to the time intervals of said bursts regardless of whether said bursts are included in the transmitted signal.

2. A color television receiver adapted to receive a television signal wherein color synchronizing bursts in a frequency range of said television signal are included only during color transmission, said bursts occurring during prescribed time intervals, said receiver including a color information channel having an input circuit responsive to the frequency range of said television signal, means to derive from said color information channel a control signal representative of said color synchronizing bursts, means responsive to said control signal to control the gain of said color information channel when said bursts are included in the transmitted signal and to make inoperative said color information channel when said bursts are not included in the transmitted signal, and means to maintain amplification in said color information channel during time intervals corresponding to the time intervals of said bursts regardless of whether said bursts are included in the transmitted signal.

3. In a color television receiver adapted to receive a television signal wherein color synchronizing bursts in a frequency range of said television signal are included in the transmitted signal at prescribed time intervals and occur only during color transmission, a color control circuit comprising in combination, a color information channel responsive to said frequency range of said television signal and having a plurality of amplifier circuits connected in cascade, a take-off point in said cascaded amplifier circuits after at least one of said amplifier circuits, means to derive from said takeoff point a control signal representative of the amplitude of said color synchronizing bursts, means to apply said control signal to an amplifier circuit preceding said takeoff point in said cascaded circuits to control the gain in said color information channel, and means to render said color information channel always operable during each of said time intervals during which said bursts occur when present regardless of the presence or absence of said bursts in said transmitted signal.

4. In a color television receiver adapted to receive a television signal wherein color synchronizing bursts in a higher frequency range of the frequency range of said television signal are included in the transmitted signal at prescribed time intervals and occur only during color transmission, a color control circuit comprising in combination, a color information channel responsive to said higher frequency range of said television signal and having a plurality of amplifier circuits connected in cascade, a takeoff point in said cascaded amplifier circuits after at least one of said amplifier circuits, means to derive from said takeoff point a control signal representative of the amplitude of said color synchronizing bursts, means to apply said control signal to an amplifier circuit preceding said takeoff in said cascaded circuits to disable the operation of said color information channel during reception of the transmitted signal not including the color synchronizing bursts, and means to render said color information channel always operable during each of said time intervals during which said bursts occur when present regardless of the presence or absence of the synchronizing burst in said transmitted signal.

5. A color television receiver adapted to receive a television signal wherein color bursts in a prescribed frequency range of said signal and having prescribed time intervals are included only during color transmission, said bursts providing information relating to both color signal strength and color information detection, the combination; a color information signal amplifier having an input circuit, a gain control terminal at a first point and a signal output circuit at a second point wherein signals applied to said input circuit are amplified between said first and second points; means to apply said frequency range of said television signal to said input circuit, means coupled to said signal output circuit to derive a control signal indicative of the presence or absence of said color bursts and of said color signal strength when said bursts are present, means to apply said control signal to said gain control terminal to control the amplification of said color information signal between said prescribed time intervals, and means to provide for amplification in said color information signal amplifier between said input circuit and said signal output circuit during said time intervals.

6. In combination, an amplifier circuit adapted to receive incoming signals in which synchronizing information may or may not be present, said synchronizing information when present having prescribed waveforms and duration intervals, said amplifier circuit having an output circuit and a gain control circuit and having gain-versus-frequency characteristics suitable for the translation of said incoming signals, a synchronizing information separating device coupled to said output circuit to separate said synchronizing information from said incoming signals, a means responsive to said separated synchronizing information for developing a reference voltage indicative of the presence or absence of said synchronizing information and also of the signal strength of said synchronizing information when present, a pulsed electron control device having electron conduction responsive to said reference voltage and coupled to said gain control electrode to develop a control potential at said gain control circuit to cause said amplifier circuit to amplify at all times corresponding to said synchronizing information duration intervals and to adjust the gain of said amplifier circuit to a predetermined gain level at all times other than the duration intervals normally occupied by said synchronizing information when said synchronizing information is absent.

7. In a color television receiver of the type having chrominance channels, and adapted to receive a television signal wherein a color synchronizing burst and a chrominance signal are present during the transmission of color information in a frequency range of said television signal and are absent during the transmission of monochrome information, a color control circuit comprising in combination; a chrominance signal and color synchronizing burst amplifier circuit having at least an input circuit, an output circuit and a gain control circuit; means for coupling said frequency range of said television signal to said input circuit; burst separation means coupled to said output circuit for separating said bursts from said chrominance signal; a burst detection circuit responsive to said separated bursts to develop a reference signal which is indicative of the presence or absence of said bursts; apparatus responsive to said reference signal and coupled to said gain control circuit of said chrominance signal and color synchronizing burst amplifier circuit to adjust the gain of said chrominance signal and color synchronizing burst amplifier to a predetermined level when said bursts are present and to reduce the gain of said chrominance signal and color synchronizing burst amplifier to substantially zero when said bursts are absent; a pulser means coupled to apply pulses to said apparatus to adjust the gain of said chrominance signal and color synchronizing burst amplifier to at least a second predetermined level during duration intervals normally occupied by said bursts during color transmission when said bursts are absent.

8. In a color television receiver adapted to receive a television signal wherein a chrominance signal and color synchronizing bursts are present in a frequency range of said television signal during the transmission of color information and absent during the transmission of monochrome information, said color synchronizing bursts occupying prescribed time intervals in said television signal when present, a color control circuit comprising in combination, a chrominance signal channel including a chrominance amplifier and responsive to said frequency range of said television signal, a burst separator circuit coupled at a predetermined point in said chrominance channel after said chrominance amplifier, a burst detector circuit coupled to said burst separator circuit to develop a reference potential indicative of the presence or the absence of said bursts and also of burst amplitude when said bursts are present, means responsive to said reference potential to reduce the gain in said chrominance signal channel at a point preceding said first named point to substantially zero in between time intervals normally occupied by said bursts when said bursts are absent and to vary said gain according to a relationship with respect to the signal strength of said bursts when said bursts are present, a pulse source to develop first and second pulses each having at least the time intervals normally occupied by said burst, means for coupling said first pulses to said gain control terminal to adjust the gain of said chrominance signal channel to a level during the time intervals normally allotted to said bursts, and means controlling the amplitude of said second pulses, and means coupled from said pulse amplitude controlling means to said chrominance signal channel to cause said second pulses to control the gain of said chrominance signal channel when said bursts are present.

9. A color television receiver adapted to receive a television signal wherein color information signals are included during color transmission and are absent during monochrome transmission, said color information signals including a color modulated subcarrier having a frequency range of said television signal and also color synchronizing bursts having prescribed time intervals and a frequency in said frequency range, said color synchronizing bursts providing information relating to both the signal strength and to reference phase information relating to said color modulated subcarrier, said color modulated subcarrier including modulations representative of a plurality of component color signals, a color control circuit comprising in combination; a color information signal amplifier having an input circuit, a gain control terminal at a first point and a signal output circuit at a second point wherein signals applied to said input circuit are amplified between said first and second points; means to apply said frequency range of said television signal to said input circuit, means coupled to said signal output circuit to derive a control signal representative of said color synchronizing bursts when absent or present, means to apply said control signal to said gain control terminal to control the amplification of said color information signal in relation to said signal strength between said prescribed time intervals, and means to provide for amplification in said color information signal amplifier between said input circuit and said signal output circuit during said time intervals.

10. In a color television receiver adapted to receive a television signal wherein a color synchronizing burst and a chrominance signal are transmitted in a frequency range of said television signal during the transmission of color information and are absent during the transmission of monochrome information, said color television receiver including a chrominance channel, a color control circuit comprising in combination, a chrominance signal and color synchronizing burst amplifier circuit in said chrominance channel and having at least an input circuit, an output circuit and a gain control circuit, means for coupling said frequency range of said television signal to said input circuit, a burst separation means coupled to a point in said chrominance channel following said chrominance signal and color synchronizing burst amplifier circuit to separate said bursts from said chrominance signal, an oscillator, a phase discriminator coupled to said oscillator and responsive to said separated color synchronizing burst to provide a reference signal which is indicative of the presence or absence of said bursts, gain control means responsive to said reference signal and coupled to said gain control circuit of said chrominance signal and color synchronizing burst amplifier circuit to adjust the gain of said chrominance signal and color synchronizing burst amplifier to a first level when said bursts are present and to a second level when said bursts are absent, a pulser means to provide pulses having time duration intervals substantially that of said bursts, means for coupling said pulser means to said gain control means to adjust the gain of said chrominance signal and color synchronizing burst amplifier to a prescribed level during the duration intervals of said pulses when said bursts are absent.

11. In a color television receiver adapted to receive a television signal, color synchronizing bursts and a chrominance signal are present in a frequency range of said television signal during the transmission of color information and absent during the transmission of monochrome information, said bursts having prescribed time intervals when present, said color television receiver including a chrominance channel, a color control circuit, comprising in combination, a chrominance signal and color synchronizing burst amplifier circuit incorporated into said chrominance channel and having at least an input circuit, an output circuit and a gain control electrode, means for coupling said frequency range of said television signal to said input circuit, a burst separation means coupled to said chrominance channel at a point following said chrominance signal and color synchronizing burst amplifier circuit to separate from said chrominance signal, a burst detector responsive to said separated bursts to provide a reference signal which is indicative of the presence or absence of said color synchronizing burst, an electron flow device having at least a flow control electrode and an output electrode, means for coupling said output electrode of said electron flow device to said gain control electrode, means for coupling said reference signal to said flow control electrode of said electron flow device to cut off said electron flow when said bursts are present and to permit electron flow when said bursts are absent, a pulse source to develop pulses having said prescribed time intervals, means for coupling said pulse source to said flow control electrode of said electron flow device to adjust the gain of said chrominance signal and color synchronizing burst to a prescribed level during the duration intervals of said pulses when said color synchronizing bursts are absent and when said color synchronizing bursts are absent to also reduce the gain of said chrominance signal and color synchronizing burst amplifier to substantially zero.

12. In a color television receiver adapted to receive a television signal wherein a chrominance signal and a color synchronizing burst are present in a frequency range of said television signal during the transmission of color information and absent during the transmission of monochrome information, said bursts having a time interval in said television signal when present, a color killer circuit comprising in combination, a chrominance signal and color synchronizing burst amplifier circuit having an input circuit, an output circuit and a gain control electrode, means for applying said frequency range of said television signal to said input circuit, a burst separation means coupled to said output circuit to separate said bursts when present from said frequency range of said television signal, means responsive to said separated bursts to provide a reference signal which is indicative of the presence or absence of said bursts and also of the signal strength of said bursts, an electron control device having at least an input circuit in which conduction control of said electron control device may be achieved and an output circuit capable of developing a control potential dependent upon the conduction of said electron control device, means for coupling the output circuit of said electron control device to said gain control electrode, and means coupling said reference signal to said input circuit of said electron control device to control the conduction of said electron control device, a pulse source adapted to provide pulses having duration intervals at least those of said color synchronizing bursts, and means for coupling said pulse source to the input circuit of said electron control device to alter the conduction of said electron control device whereby when said bursts are absent the amplification of said chrominance signal and color synchronizing burst amplifier is maintained during the duration intervals normally occupied by said pulses and reduced to zero between said intervals.

13. In a color television receiver adapted to receive a television signal wherein a chrominance signal and a color synchronizing burst are present in a frequency range of said television signal during the transmission of color information and absent during the transmission of monochrome information, said bursts having a time interval in said television signal when present, a color killer circuit comprising in combination, a chrominance signal and color synchronizing burst amplifier circuit having an input circuit, an output circuit and a gain control electrode, means for applying said frequency range of said television signal to said input circuit, a burst separation means coupled to said output circuit to separate said bursts when present from said frequency range of said television signal, means responsive to said separated bursts to provide a reference signal which is indicative of the presence or absence of said bursts and also of the signal strength of said bursts, an electron control device having at least an input circuit in which conduction control of said electron control device may be achieved and an output circuit capable of developing a control potential dependent upon the conduction of said electron control device, means for coupling the output circuit of said electron control device to said gain control electrode, and means coupling said reference signal to said input circuit of said electron control device to control the conduction of said electron control device, a pulse source adapted to provide pulses having duration intervals at least that of said color synchronizing bursts, means for coupling said pulse source to the input circuit of said electron control device to alter the conduction of said electron control device whereby when said bursts are absent the amplification of said chrominance signal and color synchronizing burst amplifier is maintained during the duration intervals normally occupied by said pulses and reduced to substantially zero between said intervals, and means responsive to said reference signal to cause the amplification to vary according to a prescribed relationship to the signal strength of said bursts when present.

14. In a color television receiver adapted to receive a television signal wherein a chrominance signal and a color synchronizing burst are present in a frequency range of said television signal during the transmission of color information and absent during the transmission of monochrome information, said bursts having a time interval in said television signal when present, a color killer circuit comprising in combination, a chrominance signal and color synchronizing burst amplifier circuit having an input circuit, an output circuit and a gain control electrode, means for applying said frequency range of said television signal to said input circuit, a burst separation means coupled to said output circuit to separate said bursts when present from said frequency range of said television signal, means responsive to said separated bursts to provide a reference signal which is indicative of the presence or absence of said bursts and also of the signal strength of said bursts, an electron control device having at least an input circuit in which conduction control of said electron control device may be achieved and an output circuit capable of developing a control potential dependent upon the conduction of said electron control device, means for coupling the output circuit of said electron control device to said gain control electrode, means coupling said reference signal to said input circuit of said electron control device to control the conduction of said electron control device, a pulse source adapted to provide pulses having duration intervals at least that of said color synchronizing bursts, means for coupling said pulse source to the input circuit of said electron control device to alter the conduction of said electron control device whereby when said bursts are absent the amplification of said chrominance signal and color synchronizing burst amplifier is maintained during the duration intervals normally occupied by said pulses and reduced to substantially zero between intervals, and means capable of altering the amplification of said chrominance signal and color synchronizing burst amplifier circuit during the operation of said color television receiver.

15. In a color television receiver adapted to receive a signal wherein a chrominance subcarrier wave signal occurs during line trace time and a color synchronizing burst occurs during retrace time, a color killer system comprising, a chrominance and burst amplifier, means for impressing said chrominance signal and said burst upon the input of said amplifier, a burst separator coupled to the output of said amplifier, a burst detector coupled to the output of said burst separator and providing an output signal indicating the amplitude of bursts at the output of said burst separator, a source of pulses occurring during said bursts, and means responsive to said source of pulses and to the output of said burst detector to disable said amplifier solely during the interval between said pulses when bursts are below a predetermined threshold amplitude.

16. In a color television receiver adapted to receive a signal wherein a chrominance subcarrier wave signal occurs during line trace time and a color synchronizing burst occurs during retrace time, a color killer system comprising, a chrominance and burst amplifier, means for impressing said chrominance signal and said burst upon the input of said amplifier, a burst separator coupled to the output of said amplifier, a burst detector coupled to the output of said burst separator and having an output circuit providing a signal indicating the presence or absence of bursts at the output of said burst separator, said output circuit having a time constant longer than one line trace interval, a source of pulses occurring during said bursts, and color killer means responsive to said source of pulses and to the output of said burst detector to disable said amplifier during the interval between said pulses when bursts are absent at the output of said burst separator.

17. In a color television receiver adapted to receive a signal wherein a chrominance subcarrier wave signal occurs during line trace time and a color synchronizing burst occurs during retrace time, a color killer system comprising, a chrominance and burst amplifier, means for impressing said chrominance signal and said burst upon the input of said amplifier, a burst separator coupled to the output of said amplifier, a burst detector coupled to the output of said burst separator and providing a direct current output voltage indicating the presence or absence of bursts at the output of said burst separator, a source of pulses occurring during said bursts, and means responsive to said source of pulses and to the output of said burst detector and operative when bursts are absent to disable said amplifier during the interval between said pulses.

18. In a color television receiver adapted to receive a signal wherein a chrominance subcarrier wave signal occurs during line trace time and a color synchronizing burst occurs during retrace time, a color killer system comprising, a chrominance and burst amplifier, means for impressing said chrominance signal and said burst upon the input of said amplifier, a burst separator coupled to the output of said amplifier, a burst detector coupled to the output of said burst separator and having an output circuit providing a signal indicating the presence or absence of bursts at the output of said burst separator, said output circuit having a time constant longer than one line trace interval, a color killer circuit responsive to the output of said burst detector and operative to disable said amplifier when bursts are absent at the output of said burst separator, a source of pulses occurring during said bursts, and means to couple said source of pulses to said color killer circuit to disable said color killer circuit during the burst interval.

19. In a color television receiver adapted to receive a signal wherein a chrominance subcarrier wave signal occurs during line trace time and a color synchronizing burst occurs during retrace time, a color killer system comprising, a chrominance and burst amplifier, means for impressing said chrominance signal and said burst upon the input of said amplifier, a burst separator coupled to the output of said amplifier, a burst detector coupled to the output of said burst separator and providing a direct current voltage representative of the amplitude of said bursts, a source of pulses occurring during said bursts, and a color killer amplifier device having an input coupled to the outputs of said burst detector and said source of pulses, said amplifier device having an output coupled to said chrominance and burst amplifier to disable said chrominance and burst amplifier during the interval between said pulses when the bursts are below a predetermined threshold amplitude.

20. In a color television receiver adapted to receive a signal wherein a chrominance subcarrier wave signal occurs during line trace time and a color synchronizing burst occurs during retrace time, a color killer and automatic chroma control system comprising, a chrominance and burst amplifier, means for impressing said chrominance signal and said burst upon the input of said amplifier, a burst separator coupled to the output of said amplifier, a burst detector coupled to the output of said burst separator and providing a direct current output voltage having an amplitude representative of the amplitude of said bursts, a first source of pulses occurring during said bursts, means responsive to said first source of pulses and to the output of said burst detector and operative when bursts are absent to disable said amplifier during the interval between said pulses, a second source of pulses having a manually controllable amplitude, and means responsive to said second source of pulses and to the output of said burst detector and operative when bursts are present to control the gain of said amplifier.

21. In a color television receiver adapted to receive a signal wherein a chrominance subcarrier wave signal occurs during line trace time and a color synchronizing burst occurs during retrace time, a color killer and automatic chroma control system comprising, a chrominance and burst amplifier, means for impressing said chromiance signal and said burst upon the input of said amplifier, a burst separator coupled to the output of said amplifier, a burst detector coupled to the output of said burst separator and providing a direct current output voltage having an amplitude representative of the amplitude of said bursts, a first source of pulses occurring during said bursts, a color killer amplifier device having an input coupled to said first source of pulses and to the output of said burst detector and an output coupled to said chrominance and burst amplifier and operative when bursts are absent to disable said chrominance and burst amplifier during the interval between said pulses, a second source of pulses having a manually controllable amplitude, and means responsive to said second source of pulses and to the output of said burst detector and operative when bursts are present to control the gain of said chrominance and burst amplifier.

References Cited in the file of this patent

UNITED STATES PATENTS 2,681,379 Schroeder ---------------- June 15, 1954

2,744,155 Kihn -------------------- May 1, 1956

OTHER REFERENCES

Color TV, Admiral, March 1954, page 36.

RCA, Model CT-100, March 31, 1954, pages 32 and 33.

Color TV, Rider Publication, March 1954, pages 141 and 142.